(12) United States Patent
Alley et al.

(10) Patent No.: US 11,917,950 B2
(45) Date of Patent: *Mar. 5, 2024

(54) HAY BALER

(71) Applicant: AWG Enterprise LLC, Culver, OR (US)

(72) Inventors: Jack D. Alley, Culver, OR (US); James Whitaker, Madras, OR (US); Gary G. Gomes, Antelope, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/706,240

(22) Filed: Mar. 28, 2022

(65) Prior Publication Data

US 2022/0210979 A1   Jul. 7, 2022

Related U.S. Application Data

(63) Continuation of application No. 16/945,532, filed on Jul. 31, 2020, now Pat. No. 11,284,567.

(51) Int. Cl.
| | | |
|---|---|---|
| *A01F 15/10* | (2006.01) | |
| *A01F 15/04* | (2006.01) | |
| *B30B 9/30* | (2006.01) | |

(52) U.S. Cl.
CPC .......... *A01F 15/101* (2013.01); *A01F 15/042* (2013.01); *A01F 15/046* (2013.01); *B30B 9/3092* (2013.01); *A01F 2015/102* (2013.01); *A01F 2015/103* (2013.01); *A01F 2015/108* (2013.01)

(58) Field of Classification Search
CPC .... A01F 15/101; A01F 15/042; A01F 15/046; A01F 2015/102; A01F 2015/103; A01F 2015/105; A01F 2015/108; B30B 9/301; B30B 9/3092

USPC ................. 100/179, 185, 186, 189
See application file for complete search history.

(56) References Cited

U.S. PATENT DOCUMENTS

| | | | | | |
|---|---|---|---|---|---|
| 524,771 | A | * | 8/1894 | Stokely | B30B 9/3067 100/190 |
| 845,356 | A | * | 2/1907 | Huggins | B30B 9/3092 100/138 |
| 2,381,620 | A | * | 8/1945 | Russell | A01F 15/101 100/189 |
| 3,554,117 | A | * | 1/1971 | Goldkuhle | B30B 9/3089 100/269.06 |
| 3,818,673 | A | * | 6/1974 | Rollins | B65B 63/02 53/529 |
| 4,011,710 | A | * | 3/1977 | Schmitt | B30B 9/3092 100/189 |
| 4,604,858 | A | * | 8/1986 | Esau | A01F 15/04 100/189 |
| 8,122,822 | B1 | * | 2/2012 | Horst | A01D 85/002 100/188 R |
| 11,284,567 | B1 | * | 3/2022 | Alley | A01F 15/101 |
| 2015/0296716 | A1 | * | 10/2015 | Verhaeghe | A01F 15/04 56/432 |

* cited by examiner

*Primary Examiner* — Jimmy T Nguyen
(74) *Attorney, Agent, or Firm* — Donn K. Harms

(57) ABSTRACT

A baler for hay, straw, grass, and similar feed materials is provided. The baler communicates compressed material from a vertically inclined compression passage formed in between opposing conveyer belts to a central area of a baling chamber for baling. A plunger within the baling chamber can reciprocate in two directions to form bales which are tied and discharged from both ends of the baling chamber.

11 Claims, 10 Drawing Sheets

HAY BALER

This application is a Continuation of U.S. patent application Ser. No. 16/945,532 filed on Jul. 31, 2020, which is incorporated herein in its entirety by this reference thereto.

BACKGROUND OF THE INVENTION

1. Field of the Invention

The present invention relates generally to baling devices employed to bale hay, straw, and similar crops and for other materials which are baled for transport and storage. More particularly, it relates to a baler device with a stacked configuration between gathered material and a baler chamber which can operate to bale such materials and crops using a bidirectional or reciprocating system.

2. Prior Art

It is a common practice to feed animals hay and similar harvested crops. Most such feed material is baled upon being cut, or soon thereafter, in order to provide compact storage and to render it more easily transportable. One common type of baler, in industrialized countries today, is the round baler. It produces cylinder-shaped "round" or "rolled" bales. When the rolled bale reaches a predetermined size, a flexible constraint such as netting or twine is wrapped around it to hold its shape, and the rear of the baler swings open to discharge the rolled bale. However, conventional bales produced in this round or rolled fashion can become large and very heavy and due to their shape are prone to rolling.

A more easily shipped and maneuvered bale is formed in a rectangular or cube shape, and such are easier to transport than round bales, since there is little risk of the rectangular bale rolling off the back of a transport trailer. The rectangular shape of the individual bales also saves space because it allows for transport and storage stacked in a slab like configuration, which is not prone to rolling. Such rectangular bales are better suited for use for livestock feedlot operations, where many tons may be needed for feeding animals every hour.

Conventionally, using machinery adapted to form a rectangular bale, the material to be baled (such as hay or straw) from a windrow, is lifted from the windrow by tines in the reel of the baler. The lifted material is then communicated into the bale chamber having a plunger therein. Within the bale chamber is located a plunger which is engaged to translate for compression within the bale chamber.

As the plunger moves in a first direction within a conventional bale chamber, it compresses the material to be baled between the plunger and a sidewall located in the bale chamber. This compacts the material and concurrently cuts it from the compressed stream with a knife engaged to the plunger. Once compacted within one end of the bale chamber, a plurality of bale knotters each employ a needle to encircle and tie a flexible restraint such as twine or wire or other material around the exterior of the formed bale.

As each new bale is compressed and tied within the bale chamber, a previously tied bale is driven out of the rear of the baling chamber. The bales, once discharged from the bale chamber, can follow a pathway to either drop to the ground, or may be sent to a wagon towed behind the baler. This process continues as long as there is material in a windrow to be baled.

The forgoing examples of related art in the field of hay balers and limitation related therewith are intended to be illustrative and not exclusive, and they do not imply any limitations on the bi directional baler invention described and claimed herein. Various limitations of the related art will become apparent to those skilled in the art upon a reading and understanding of the specification below and the accompanying drawings.

SUMMARY OF THE INVENTION

The device herein disclosed and described provides significant enhancement to the art of baling of materials such as hay and straw and the like. For the sake of convenience, the device herein is referred to primarily as a hay baler. However, it may be employed to compress and bale other materials such as straw, cotton, flax straw, salt marsh hay, corn stalks, or other silage materials. Consequently, the term "hay" is intended to mean any agricultural material which is baled for storage or transport, and should not be considered limiting.

The device herein employs a conventional mower, tines, or other material pickup mechanisms, for picking up hay or other crop material from the ground. The device herein also employs a transfer mechanism for moving the gathered material laterally, and to a compression passage of the device, which communicates the gathered material to a baling chamber. Such mowers and transfer mechanisms and other material gathering mechanisms are well known in the art, and are conventionally part of, or are towed by, a tractor or the like.

As in conventional balers, the device herein may be operatively engaged to a power takeoff shaft of the motorized tractor, and/or have an onboard motor and/or onboard electric generator, to provide one or both of mechanical or electric power with which to energize and power motors for running the conveyer belts and to power mechanical components which will tie and urge tied bales down exit pathways to an ejection from the baling device herein.

Material to be baled by the device herein, is so gathered and fed in a stream of such material, to an entry end of a vertically disposed compression passage. The compression passage employs two opposing moving belts, which are positioned across a continuously narrowing gap from each other, to form a compressed stream of material to be baled, which is then communicated into a baling chamber. The compression passage thus both lifts and compresses material vertically at the same time, and deposits a compressed stream into an overhead baling chamber.

While the unique compression chamber and overhead baling chamber configuration will provide a significant improvement in the performance of a baling chamber with one exit, the device herein provides additional utility when configured with a baling chamber having two bale forming sections, on opposite sides of a plunger. The plunger is operatively engaged to translate back and forth within the bale chamber to thereby form bales both on a first end of the baling chamber and on an opposite second end of the baling chamber. It should be noted however that the disclosed belt-driven and formed compression passage, may also be employed in a conventional hay baler, which compresses bales in only one end of a bale chamber and would provide significant speed and feeding utility over conventional material feeding components to a baler.

To enable this bidirectional baling action, a compressed portion of hay or other material, is communicated to a central area of the baling chamber, in a compressed stream from the compression passage formed in between the pair of powered belts and opposing sidewalls of the compression passage. Hay or other material communicated into this compression passage is forced between the opposing sidewalls, and the narrowing area between the opposing belts, and is thereby elevated and concurrently formed to a compressed stream of hay or other material to be baled.

As noted, the two moving belts are powered by conventional electric motors and/or by mechanical power such as a drive shaft in an operative connection to the pulling tractor. The two opposing belts are positioned in-between opposing sidewalls to form this compression passage, which has a first end or entry to the compression passage, with a wider gap between the two opposing belts. Hay, straw, or other material to be baled which enters the compression passage formed between the two moving belts at the first end, is both lifted and compressed and then communicated in compressed portions from a compressed stream of material, into the central area of the baling chamber. During movement between the belts and the opposing sidewalls, the stream of hay moving within the formed compression passage is compressed by the narrowing of the gap between the two moving belts, which is positioned in-between the opposing sidewalls forming the compression passage. The pulleys or the like powering and holding the two belts, may be engaged to the sidewalls and other structural components.

Using a flow controller the speed of the two moving belts, and thus the speed of the linear flow of the stream of compressed material entering the central area of the baling chamber, from the exit end of the compression passage may be adjusted and controlled. This control of the speed of the material stream of compressed material is employable to determine or fix a metered amount of compressed material, from the stream of material, which is deposited into the central area of the baling chamber. Such may be accomplished by a speed control unit engaged to the electric power and to the motors or mechanical drives and gearing engaged to powered shafts which move the two opposing belts, or other speed controller means.

Once this metered amount of hay material is communicated into the central area of the baling chamber, the bidirectional plunger is actuated to advance from a first stationary position closer to the first end of the baling chamber, in a first stroke toward the hay material. In this first stroke, the plunger moves toward the second end of the bailing chamber, to a second stationary position adjacent a second of the baling chamber.

Concurrently, with the movement of the plunger to the second stationary position, a knife on the plunger will operate to sever the metered portion of material, from the compressed stream of material communicated into the baling chamber from the compression passage. Thereafter, in a conventional fashion, a plurality of needles and knotting components, which are well known in the art, will encircle the compressed and formed bale, with a plurality of flexible cords such as rope or twine and tie knots in each to hold them tightly wrapped around the formed bale.

During the forced sliding movement of formed and tied bales from the baling chamber caused by the force of the reciprocating plunger on the newly formed bale, a cutting bale blade may be positioned in a location to cut the previously formed larger bale, into two smaller bales. The blade will thus sever the formed bale into two bales, each of which remains tied with the flexible cords.

In the bidirectional operation, with the plunger in this second stationary position, adjacent the second end of the baling chamber, the plunger will remain substantially stationary while another metered portion from the compressed stream of material, exits the compression passage formed between the opposing belts, and is deposited into the central area of the baling chamber. Once the metered portion of the compressed stream of material is communicated to the central area of the baling chamber, the bidirectional plunger is actuated to forcibly advance from the second stationary position, in a second stroke toward the compressed metered portion of material, and back to the first stationary position, adjacent the first end of the baling chamber.

Concurrently, with the movement of the plunger back to the first stationary position, the knife operating with the plunger will cut the metered portion of compressed material within the central area of the baling chamber, from the compressed stream of material. With the metered portion of compressed material moved to the first end of the baling chamber, by contact with the plunger, a plurality of needles and knotting components at that first end will encircle the formed bale with the plurality of flexible cords wrapped around the formed bale.

Currently, movement of the plunger between the first stationary position and the second stationary position, is accomplished using a powered actuator engaged to the plunger. Currently the preferred powered actuators are hydraulic or pneumatic cylinders operatively engaged to the plunger, or linear electric motors, or worm gears operatively engaged to both the actuator and to powered rotating shafts. Such are easily powered by electric or hydraulic motors, or mechanical gears, and easily controlled for timing and movement with conventional switches and valves, to provide the force, total distance of sliding, and the timing, of the bidirectional movement of the plunger between both positions. Of course other actuators as would occur to those skilled in the art may be employed to translate the plunger within the baling chamber and such are considered within the scope of this invention.

An electronic or mechanical plunger controller may be employed to operate the actuators, to cause the plunger to stop and to also move toward the first end and second end of the baling chamber in timed translations. Such may be employed in conjunction with a signal or timer or other determination that the appropriate metered portion of compressed material, from the compression passage, has been communicated into the central area of the baling chamber, and the flow has stopped by stopping the belts. For example, if the actuators are pneumatic or hydraulic cylinders, a control valve may be activated in a conventional manner to force fluid into one end and the opposite end of each cylinder to translate that cylinder, and the engaged plunger. The same control would be employed with linear electric motors as the actuators by using a switch to energize them to move one way or the other.

The baling device herein, thus will form compressed bales of material such as hay at both the first end and the second end of the baling chamber in the above noted actions. Each consecutive bale so formed at each respective end of the baling chamber, is subsequently pushed toward a respective exit ramp, by the next respective formed bale at the same end of the baling chamber. This bidirectional baling action at both the first end and second end of the baling chamber, significantly increases the speed at which bales may be formed by the device as opposed to conventional balers which only form bales in one direction.

By timing the linear flow of material from the compression passage between the two belts, a metered amount of compressed material deposited into the baling chamber can be determined and controlled along with cessation of the flow as the plunger moves. A flow controller for the hydraulic motor or electric motor powering the power pulley of the two opposing belts forming the compression passage, can be employed to speed up, slow down, and to stop the belts and thus the flow of the stream of material into the bale chamber.

By flow controller is meant any conventional valve or switch or clutch or potentiometer, other component which is operatively connected to the motor engaged to rotate the pulleys, which will control the speed and movement of the pulleys providing power to move the two belts. Controlling belt movement will in turn increase, decrease, and cease the flow of compressed material in the compressed stream exiting from compression passage, which is deposited in a metered flow or amount, into the baling chamber.

Using a signal generated by or caused by the flow controller which controls the movements of the two belts, which is sent to the plunger controller, the plunger can be activated to move or stop. This signal will cause the plunger movement controller, to move the plunger between opposite ends of the baling chamber, once the appropriate metered amount of compressed material has been communicated to the central area of the baling chamber.

In comparisons against conventional one-directional balers, the device herein provided a significantly enhanced baler. This is because all of the input energy employed to translate the plunger, to form bales of material, is utilized in both directions within the baling chamber rather than only in one direction as with conventional balers. Testing indicates the result of this efficiency yields a hay baler capable of achieving in excess of 3-4 times the output capacity of conventionally available 3-string balers.

Further, due to the efficiency of the compression passage formed between the two moving belts and sidewalls, which lift and compress a stream of material into the central area of the baling chamber, testing indicates that the baling device herein is more gentle in its handling of the hay or other material being baled. Such which will result in much higher feed values of the finished product and a longer life span of the baler itself.

Additionally preferred in the current device, is the inclusion of a bale knife. Such a bale knife is located at both the first end and second end of the baling chamber. As a formed bale is pushed from a respective end of the baling chamber in the action noted above, the respective bale knife located in the path of the exiting previously tied bale, will cut the exiting bale in half to form two smaller bales. Experimentation with the configuration of the bale knife respectively located at opposite ends of the baling chamber, has shown that forming it with an angle of between 5-20 degrees, forms significantly cleaner and faster cuts of the bales passing thereover.

Further, the angle of the elongated bale knife has been found to require less energy to sever the formed bale, and has shown to make a fast and very clean cut, such that baled material does not extend from ends of the cut bales where it can jam machinery. A particularly preferred angle of each bale knife is an angle being between 11-13 degrees. This angular positioning of the elongated bale knife, in testing, has shown to yield the fastest cutting of the bale using minimum energy or force from the plunger. Additionally, this preferred angle yielded the cleanest severing of the larger bale, which minimized uncut material from projecting from the end of the two smaller bales.

With respect to the above description, before explaining at least one preferred embodiment of the herein disclosed bidirectional hay baler invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements. Finally, the term "substantially" if not otherwise defined, means plus or minus ten percent.

It is an object of this invention, to provide a baler, which operates to compact, tie, and discharge formed and tied bales, in a bidirectional baling chamber, thereby significantly increasing production.

It is a further object of this invention to provide such a bidirectional baler, which can discharge finished bales on one or two sides of the baler.

Other objects, features, and advantages of the present baler invention, as well as the advantages thereof over existing prior art, will become apparent from the description to follow, and are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive, examples of embodiments and/or features of the disclosed bidirectional baler. It is intended that the embodiments and figures disclosed herein are to be considered illustrative rather than limiting.

Figure 1:
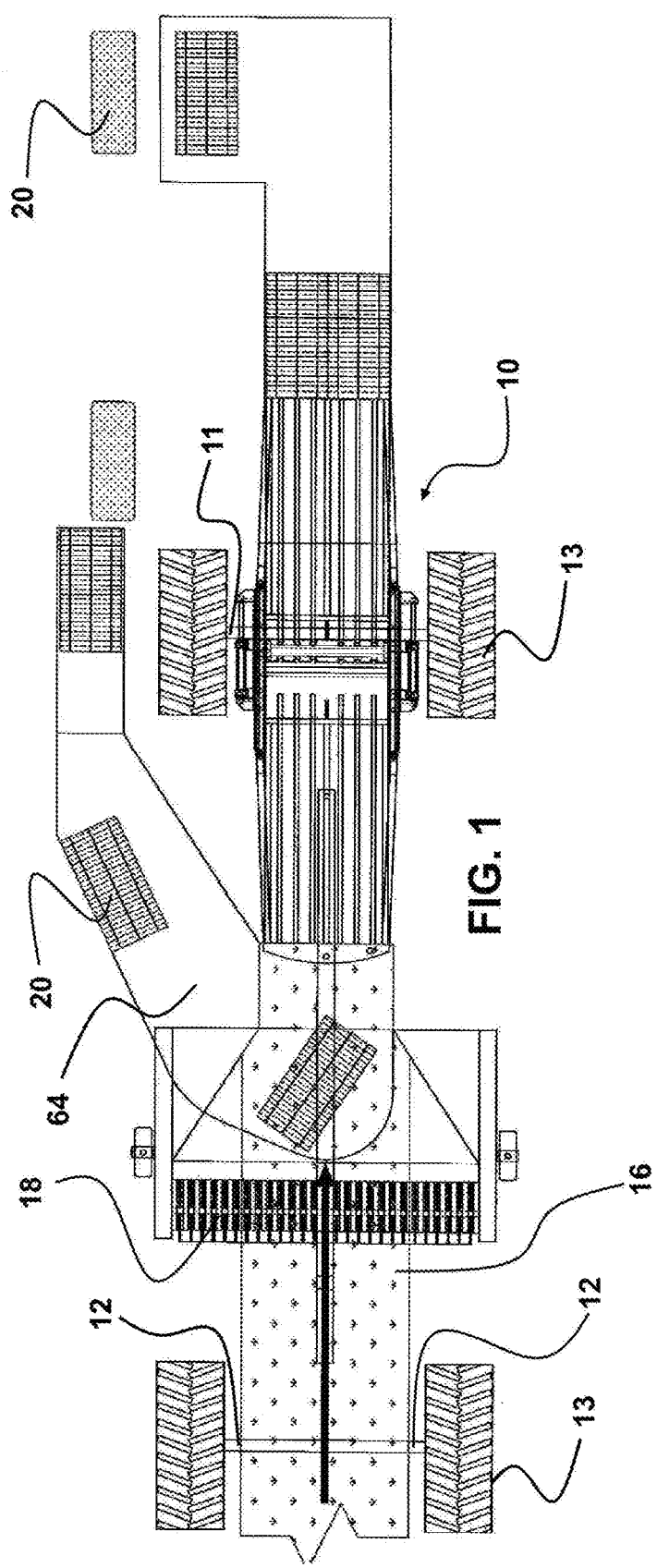
FIG. 1 shows an overhead view of the baling device operatively engaged to machinery which gathers hay or other material to be baled from a single windrow, and which forms bales in both ends of a baling chamber which are discharged on one side of the baling device.

Other aspects of the present invention shall be more readily understood when considered in conjunction with the accompanying drawings, and the following detailed description, neither of which should be considered limiting.

DETAILED DESCRIPTION OF THE PREFERRED EMBODIMENTS OF THE INVENTION

In this description, the directional prepositions of up, upwardly, down, downwardly, front, back, top, upper, bottom, lower, left, right and other such terms refer to the device as it is oriented and appears in the drawings and are used for convenience only, and they are not intended to be limiting or to imply that the device has to be used or positioned in any particular orientation.

Now referring to drawings in FIGS. 1-12, wherein similar components are identified by like reference numerals, there is seen in FIG. 1, an overhead view of the baling device 10 herein, operatively engaged to a powered pulling component such as a tractor 12. Power for operation of the device 10 herein can be provided from the output shaft of the tractor 12 which is not shown but well known, and/or by onboard internal combustion engines and/or electric generators and/or pumps and the like, which are all well known and need not be depicted.

As shown in FIG. 1, a pickup mechanism 18 such as conventional forks operatively engaged to an auger, which are also well known for gathering material 16 such as hay or straw from windrows, is employed to communicate material 16 to be baled, to the device 10 herein. Upon completion of compression of the material 16 and tying thereof, it is disbursed in bales 20 from the baling device 10 herein, either to the ground or to a trailer in a conventional fashion. As shown, due to the bidirectional operation of the device 10 herein, bales 20 are disbursed from two exit pathways.

Figure 2:
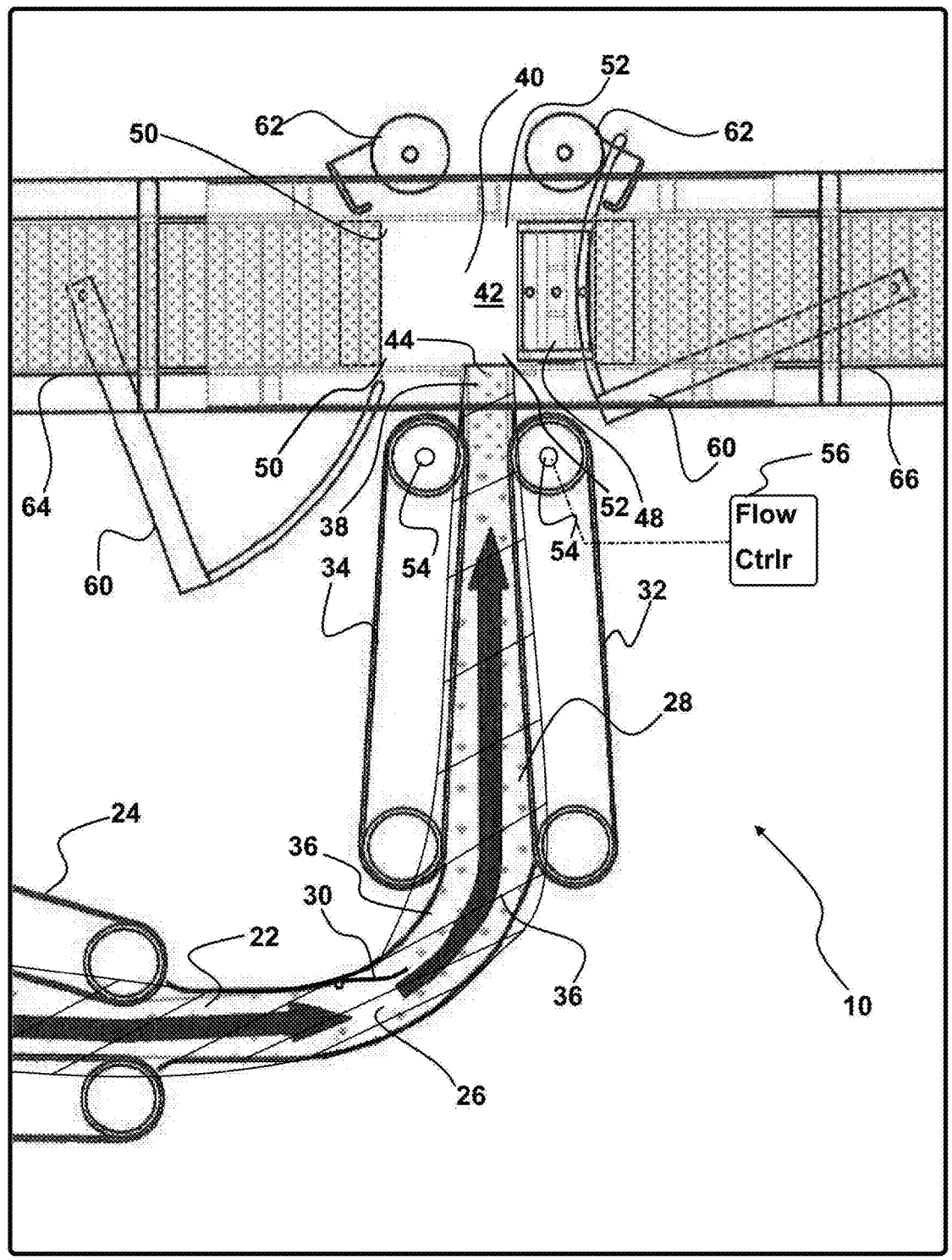
FIG. 2 depicts a side view of the device herein showing the compression passage for feeding compressed material to the baling chamber, and showing the plunger translated to the first stationary position adjacent the first end of the baling chamber, while the formed bale is encircled with knotted twine.

Shown in FIG. 2 is a side view of the device 10 herein. As shown, gathered and uncompressed material 22, gathered from the pickup mechanism 18, is communicated by a transfer mechanism, in an uncompressed material 22 stream. By transfer mechanism is meant, a mechanical or other movement component configured to receive and to move the material 16 from the pickup mechanism, such as by a first conveyer 24, to an entry end 26, of a compression passage 28. A backflow prevention valve 30 may be positioned at the entry end 26 of the compression passage 28 to prevent backflow of the uncompressed material 22.

As shown in FIGS. 2-7, forming the compression passage 28 between a powered first belt 32 and a powered second belt 34, the compression passage 28 can be positioned to run vertically, relative to an overhead baling chamber 40, to both lift and compress the uncompressed material 22. This configuration allows a much more compact device 10 in that the baling chamber 40 may be elevated above the pickup mechanism 18 and transfer mechanism communicating the compressed stream of material 44 into the baling chamber 40, and such a configuration is particularly preferred in all modes of the device 10.

By the term vertically is meant that the compression passage 28 runs at an angle between 40 to 90 degrees, relative to an axis (not shown but easily discerned in the drawings) of the interior of the baling chamber 40 such that it lifts the uncompressed material 22 into the overhead located baling chamber 40.

The compression passage 28, is defined as an area located in-between a first belt 32 and a second belt 34, and opposing sidewalls 36 on opposite sides of the formed compression passage 28. The compression passage 28 so formed extends from the entry end 26 to an exit 38 which communicates with the baling chamber 40 in a central area 42 thereof. As used herein, central area 42 means an area occupied by the metered amount 46 of compressed material from the compressed stream 44 thereof, within the baling chamber 40.

As shown a gap between the first belt 32 and second belt 34, is larger at the entry end 26 of the compression passage 28 and narrower at the exit 38 from the compression passage 28. The sidewalls 36 run parallel on opposite sides of the compression passage 28. Thus, uncompressed material 22 moving from the entry end 26 is compressed between the first belt 32 and second belt 34 and forms a compressed stream of material 44 which exits the compression passage 28 into the central area 42 of the baling chamber 40.

Figure 3:
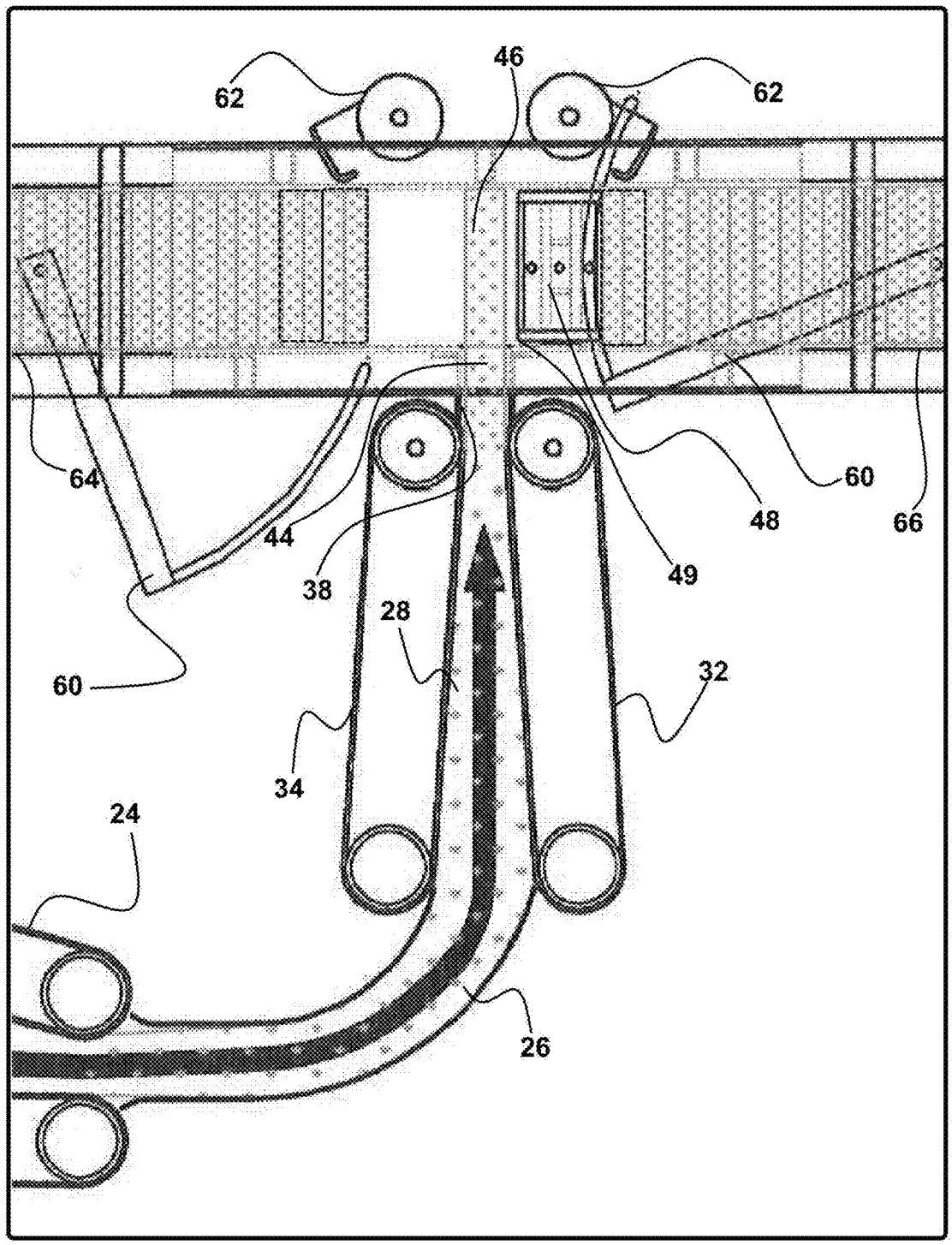
FIG. 3 shows another side view as in FIG. 2, depicting a metered amount of hay or other material being communicated to a central area of the baling chamber.
Figure 6:
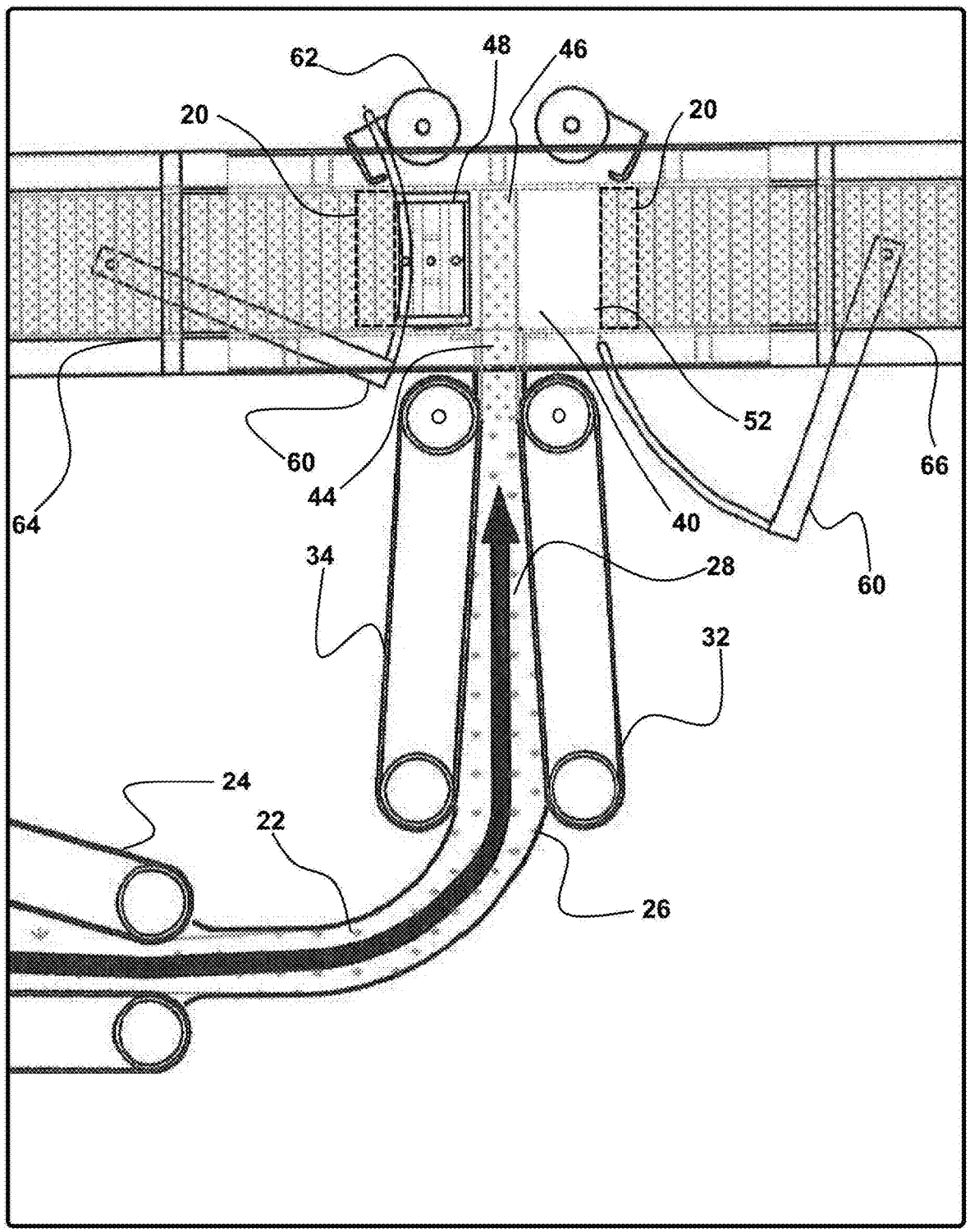
FIG. 6 shows the plunger in the second stationary position and a metered portion of compressed material being communicated to the central area of the baling chamber from the compression passage.
Figure 7:
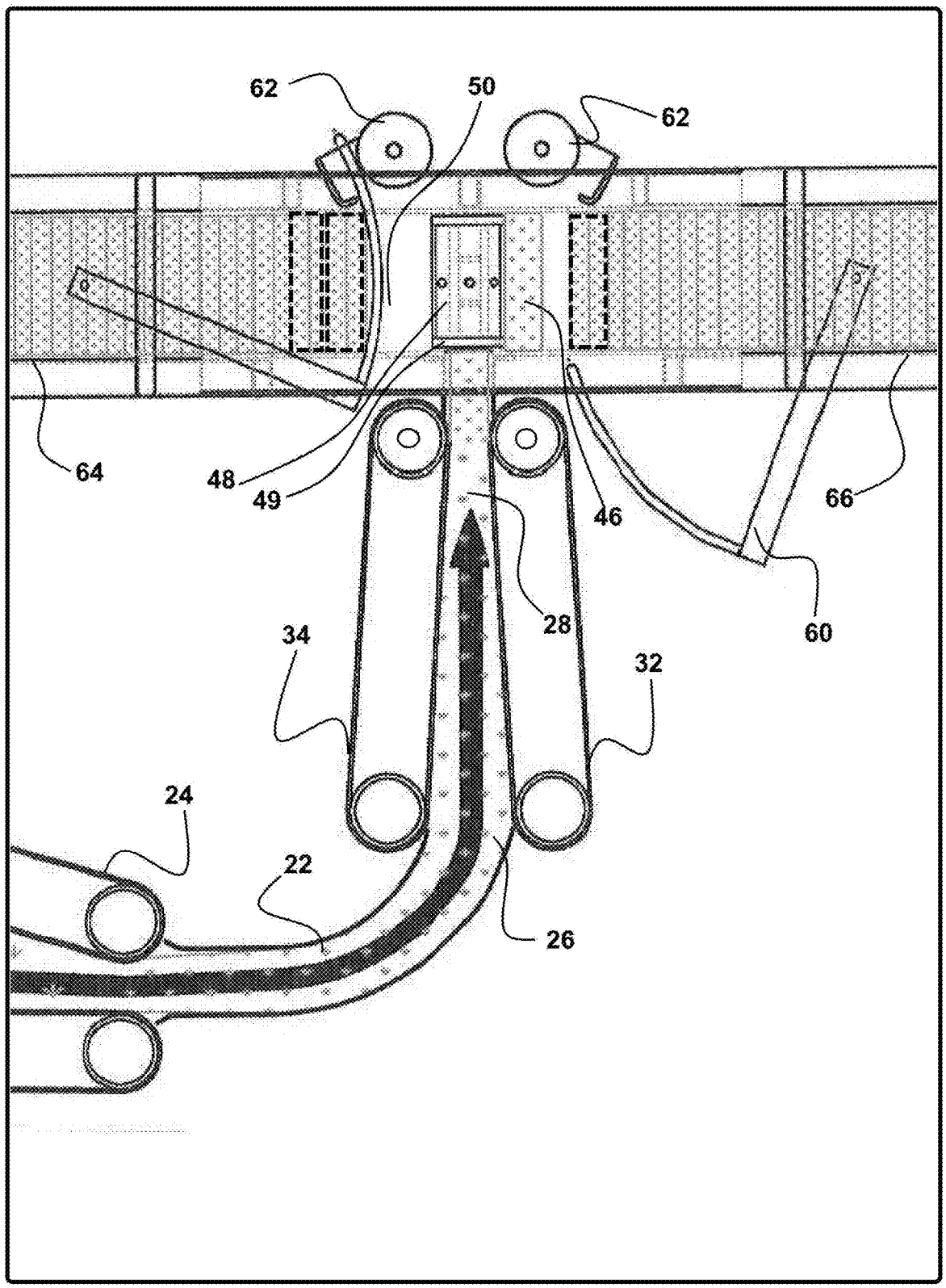
FIG. 7 depicts the plunger being forced back toward the first stationary position as in FIG. 2, where a bale is encircled with knotted twine, and shows the metered portion of compressed material having been cut by a knife on the plunger.

As noted herein, by controlling the speed and stopping and starting movement of the first belt 32 and second belt 34, a metered amount 46 of the compressed stream 44 of material, may be communicated into the central area 42 of the baling chamber 40, such as in FIGS. 3 and 6. Thus, the compression passage 28 provides for the compression of the uncompressed material 22 to be baled within the baling chamber 40, which is moved and further compressed by the plunger 48. The plunger 48 will move the metered amount 46 of compressed material, in two directions within the baling chamber 40, thereby significantly enhancing the speed at which the device 10 can bale the material and eject it.

By timing the movement thereof, the plunger 48 will be positioned to receive the metered amount of compressed material, from the compressed stream 44 on both sides thereof, depending on the positioning of the plunger 48 within the central area 42 of the baling chamber 40. Thus, the plunger 48 will push the material, from the compressed stream 44 toward either the first end 50 of the baling chamber 40 or the second end 52 of the baling chamber 40. The formed bales 20 are tied at both ends of the bailing chamber 40 and ejected therefrom thereby allowing disbursement of tied bales 20 from both of two ends of the baling chamber 40 in a significant enhancement over conventional baling chambers which only compress, tie and eject bales from one end.

As noted above, the first belt 32 and the second belt 34 are each powered to move by a powered pulley 54 operatively engaged thereto. The powered pulley 54 is operatively engaged to a conventional motor, such as an electric or hydraulic motor or the like which while not shown, is well known to those skilled in the art.

Control of speed, stopping, and movement of the belts push a determination of the metered amount 46 (FIG. 3) communicated to the central area 42 of the baling chamber 40, may be provided using a flow controller 56 which causes the motor engaged with the powered pulleys 54, to rotate them, speed them up, slow them down, or to cease that rotation. The flow controller 56 thus will operate using timing or computer control or manual control, to position the metered amount 46 of the compressed material stream 44, into the baling chamber 40. Such motor controllers are well known and can operate by using switches and potentiometers and the like, to control the electric current to a motor to control movement thereof. Where the motor is hydraulically driven, the controller 56 can operate to valve the fluid driving the motor or to control the pump pressurizing the fluid, to thereby control the speed of the motor and the resulting movement of the belts 32 and 34.

Figure 4:
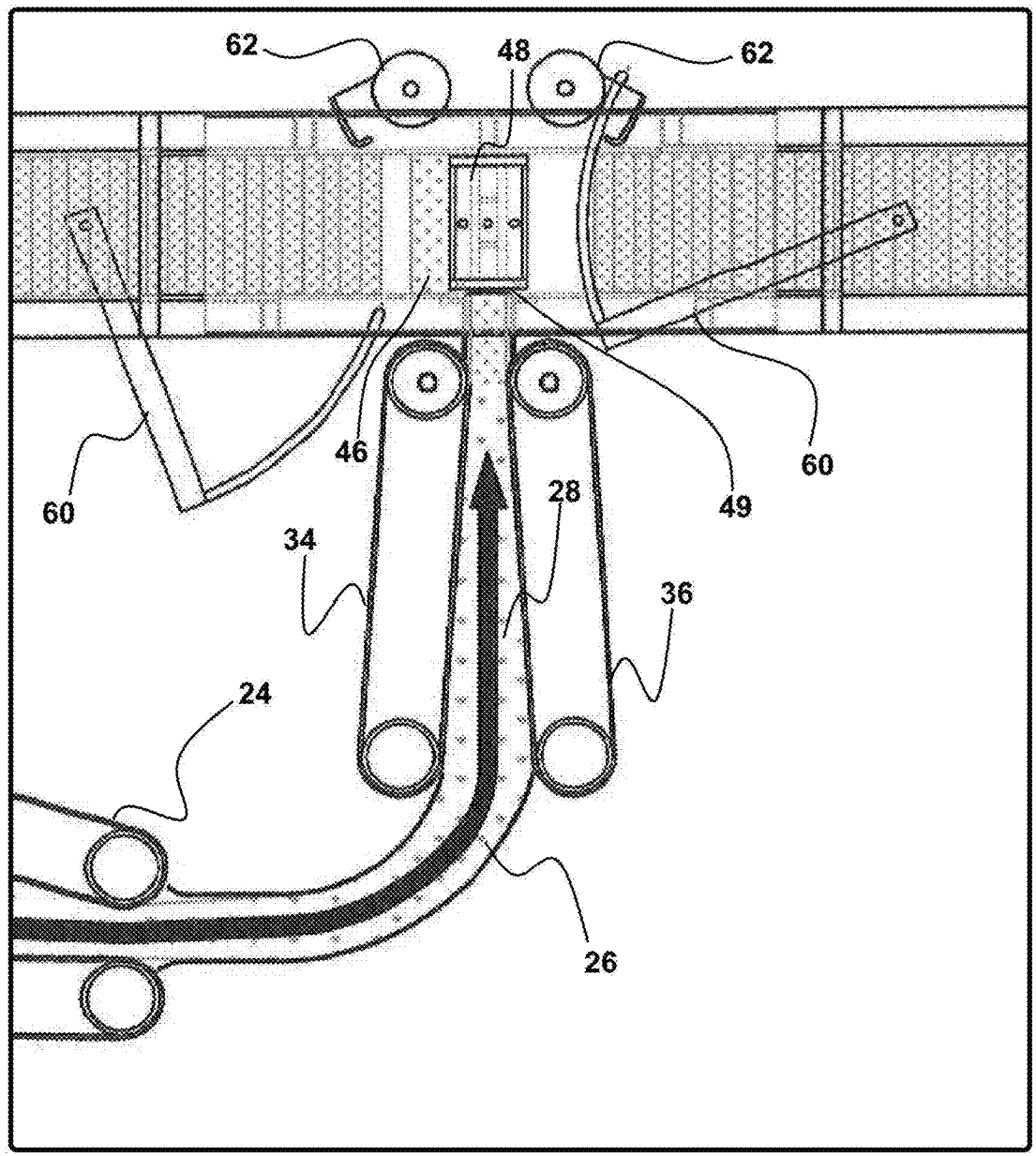
FIG. 4 shows the plunger being moved toward the second end of the baling chamber to the second stationary position shown in FIG. 5.

As shown in FIG. 2, the plunger 48 has been moved by actuators 58 (see FIG. 8) in a second direction to a second end 52 of the baling chamber 40. During this movement of the plunger 48, as shown in FIG. 4, and in FIG. 7, a knife 49 engaged with the plunger 48, will sever the metered amount 46 from the compressed stream 44 of material.

Once the plunger 48 has moved to the second end 52 of the bailing chamber 40, and pushed the metered amount 46 of material in an additionally compressed form, using a second side of the plunger 48 in contact with the metered amount of material, a tying mechanism encircles a formed compressed bale 20 with a flexible member. By tying mechanism is meant, needles 60 which encircle the bale 20 with a flexible member such as rope or twine or wire or the like, and knotters 62 which securely tie the flexible member around the formed bale 20. Such needles 60 and knotters 62 and flexible rope or twine are well known in the art and employed widely to wrap bales 20 and need not be described herein in detail.

As shown in FIG. 3, with the plunger 48 located adjacent the second end 52 of the baling chamber 40, or in-between the second end 52 and the central area 42, the flow controller 56 causes the motor rotating the powered pulleys 54 to move the first belt 32 and second belt 34 for a duration of time in which to communicate another metered amount 46 of belt compressed material from the compressed stream 44 of material, into the central area 42 of the baling chamber 40. Upon finishing such communication of the metered amount 46 of material therein, the plunger 48 is translated in a first direction by the actuators 58, toward a position adjacent the first end 50 of the baling chamber 40 by the force of the actuators 58 shown in FIG. 8.

Figure 5:
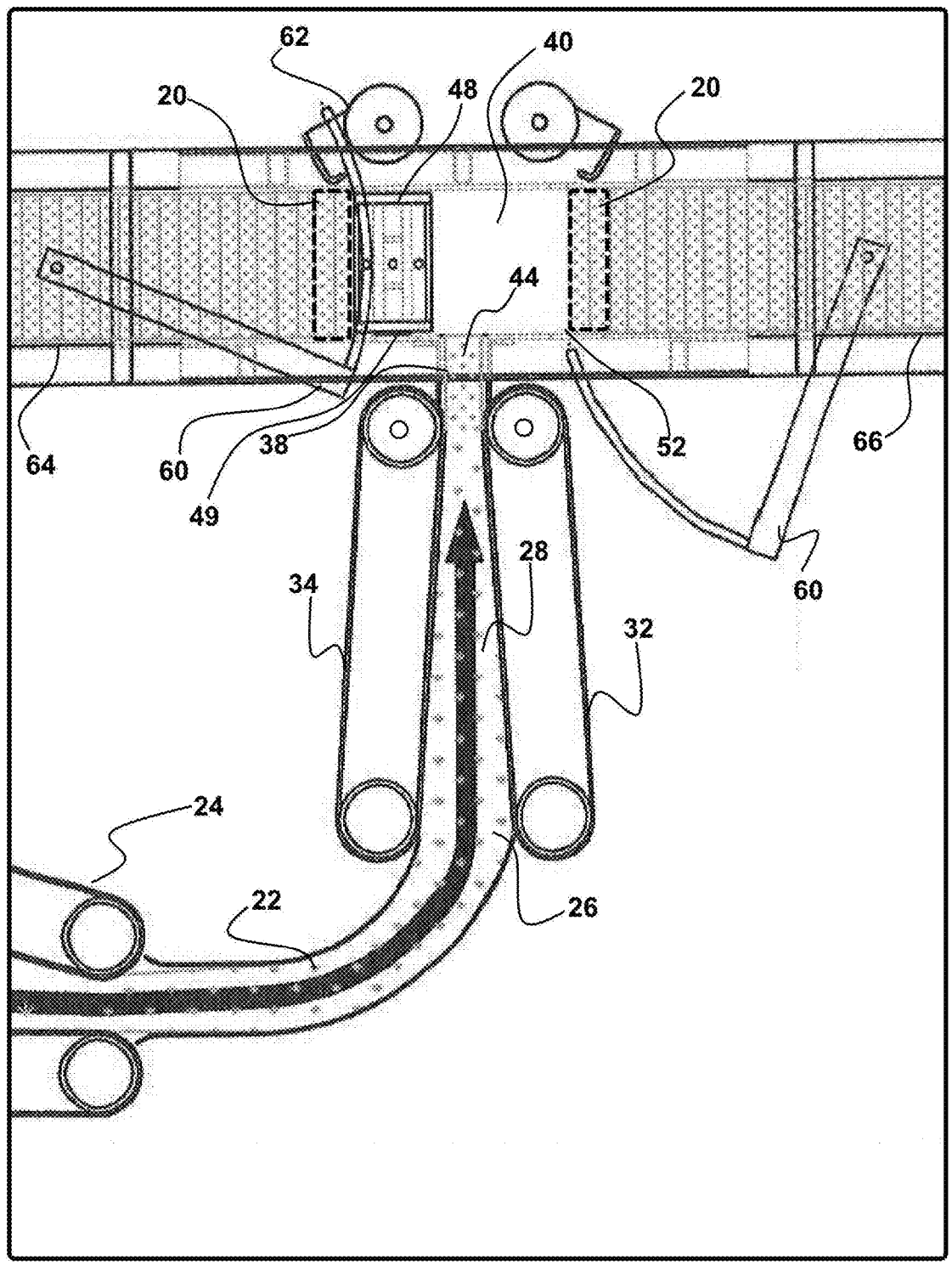
FIG. 5 depicts the plunger translated to the second stationary position wherein the metered portion of material has been cut by a knife on the plunger, and the formed bale at the second end of the baling chamber is encircled in twine by needles and knotters.

This translation in the first direction, will move the plunger 48 which will contact the metered amount 46 of material on a first side of the plunger 48. Continued movement of the plunger 48 in contact on the first side thereof will move the metered amount 46 of compressed material as in FIG. 4, toward the first end 50 of the baling chamber 40 as shown in FIG. 5. As noted, during movement of the plunger 48 in this first direction, as shown in FIG. 4, and in FIG. 7, a knife 49 engaged with the plunger 48, will sever the metered amount 46 from the compressed stream 44 of material.

As also depicted in FIG. 5, movement of the plunger 48 in the first direction will cease as it reaches a position adjacent the first end 50 of the baling chamber 40, where it has pushed the metered amount 46 of compressed material from the compressed stream 44 of material, to a contact with a previously formed bale 20.

As noted above and shown in FIG. 8, this movement of the plunger 48 is enabled by the force provided by the actuators 58. These actuators 58 are controlled as described herein, to move and cease movement of the plunger 48, in relation to the positioning of the metered amount 46 of compressed material from the compressed stream 44 of material, into the central area 42 of the baling chamber 40.

As also shown in FIG. 5, once the metered amount 46 of material is positioned by the plunger 48 at the first end 50 of the baling chamber 40, it is encircled with a flexible securement such as twine, string, or wire or the like by the plurality of conventional needles 60. Knotters 62 secure the ends of the flexible securement to hold it around the metered amount 46 of material to form another bale 20. As noted, the operation of such needles 60 and knotters 62 to encircle the bale 20 is well known to those in the art.

The pushing of the metered amount 46 of material to the first end 50 of the baling chamber 40, causes a contact against any previously formed bale 20 therein, to move it down the first exit ramp 64 exiting the first end 50 of the baling chamber 40 along with other bales 20 adjacent thereto. The same movement of previously formed bales 20 occurs at the second end 52 of the baling chamber 40 when the plunger 48 moves a respective metered amount 46 of material to contact and push previously formed bales 20 along the second exit ramp 66 communicating with the second end 52 of the baling chamber 40 to exit from the device 10.

Shown for clarity of operation in FIG. 6, with the plunger 48 in a stationary position adjacent the first end 50 of the baling chamber 40, the first belt 32 and second belt 34 are activated and moved to communicate another metered amount 46 of material from the compressed stream 44 exiting the compression passage 28, and into the central area 42 of the baling chamber 40. Thereafter in the matter described herein, and shown in FIGS. 6-7, the plunger 48 is forced by the actuators 58 toward a second stationary position adjacent the second end 52 of the baling chamber 40, wherein the compressed material in the metered amount 46 is encircled by the flexible member or encirclement material, such as string, or twine, by the needles 60 which is secured by the knotters 62.

Figure 8:
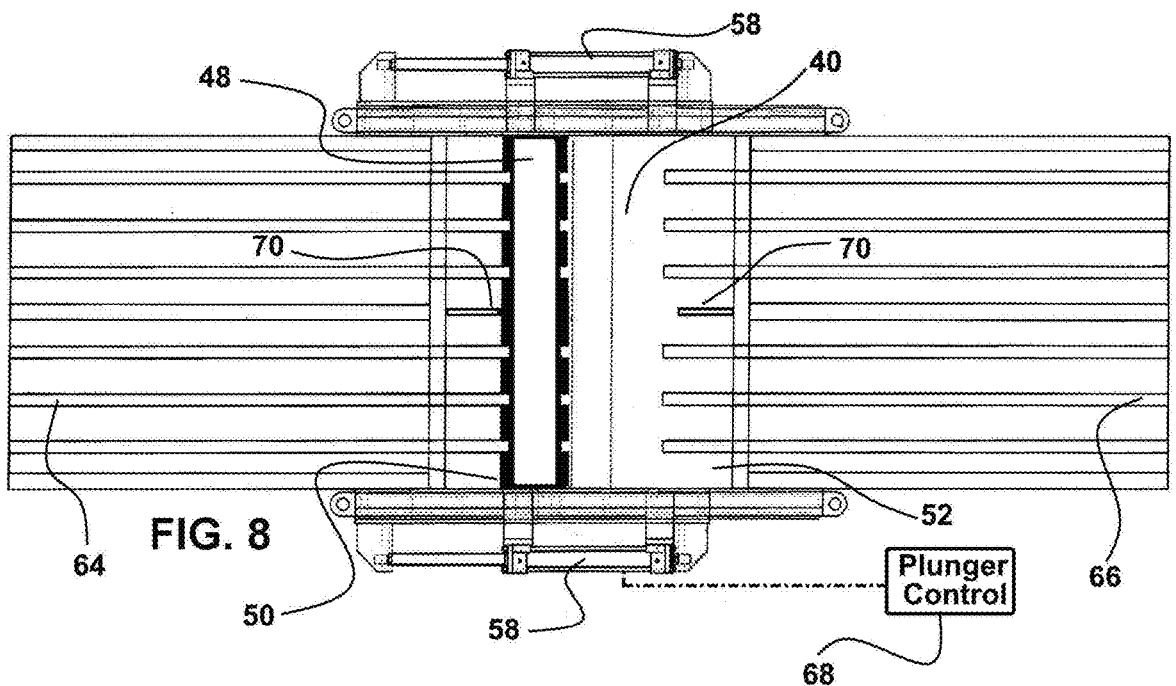
FIG. 8 shows a top view of the baling chamber with the plunger moved to the second stationary position by actuators, and showing a centrally located bale knife located at both the first and second ends of the baling chamber.

In FIG. 8 is shown an overhead view of the baling device 10, showing the plunger 48 forced by the actuators 58, to a position adjacent the first end 50 of the baling chamber 40. Also shown are centrally positioned bale knife 70 located at each of the two ends of the baling chamber 40. As noted, the actuators 58 may be pneumatic cylinders, hydraulic cylinders, or a linear electric motor, or other powered actuators as will operate to force the plunger 48 back and forth within the baling chamber 40 when activated to do so by the flow controller or other computer, switched, or mechanical timing means.

For example movement of and stopped positioning of the plunger 48, may be controlled by a plunger control 68. The plunger control 68 can be activated to cause the actuators 58 to translate the plunger 48 in either the first or second direction within the baling chamber 40, by a signal communicated from the flow controller 56, once it has positioned the determined metered amount 46 within the baling chamber 40. Such a signal may be an electronic signal, or a hydraulic signal along fluid or compressed air line, a mechanical communication, or by other conventional signaling means, or may employ a computer having software configured to the task of timing the movement of the belts 32 and 34, in relation to the proper positioning of the metered amount 46 of compressed material within the baling chamber 40.

Figure 9:
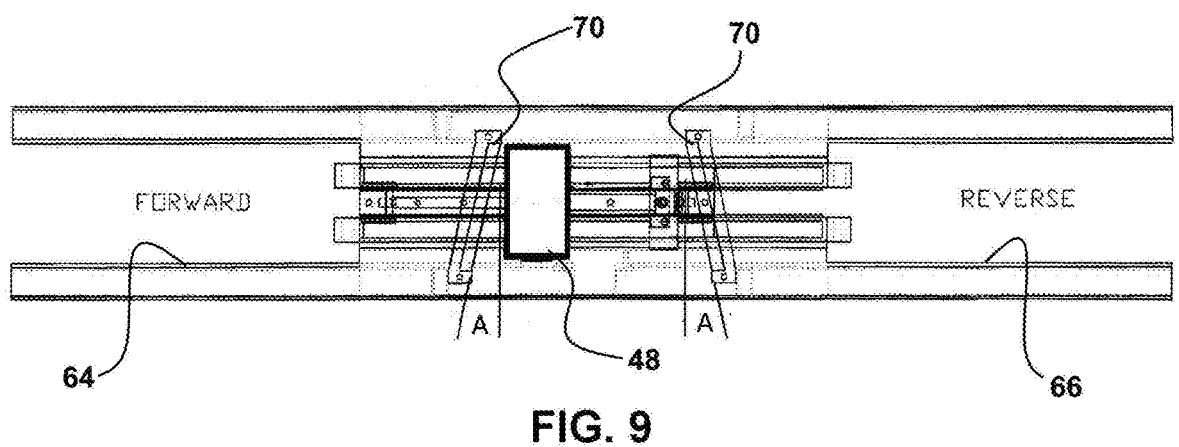
FIG. 9 depicts a side view of the device as in FIG. 8, showing the plunger at the second end of the baling chamber, and showing each bale knife positioned to run at an angle A, relative to the surface of bale exit pathways located at each end of the bale chamber.

The bale knife 70 positioned on both the first end 50 and second end 52 of the baling chamber 40 is a preferred component to form smaller bales from the single bale formed at each end of the baling chamber 40 as described above. As shown in FIG. 9, in essentially a side view of the device as in FIG. 8, each bale knife 70 is elongated and has an angle "A." The angle "A" inclines relative to the surface of the first exit ramp 64 and second exit ramp 66 at a preferred angle of 5-20 degrees. Experimentation has shown that a particularly preferred angle "A" of each bale knife 70 between 11-13 degrees works best to more easily slice the bales 20 with the least resistance and such would be most preferred.

Figure 10:
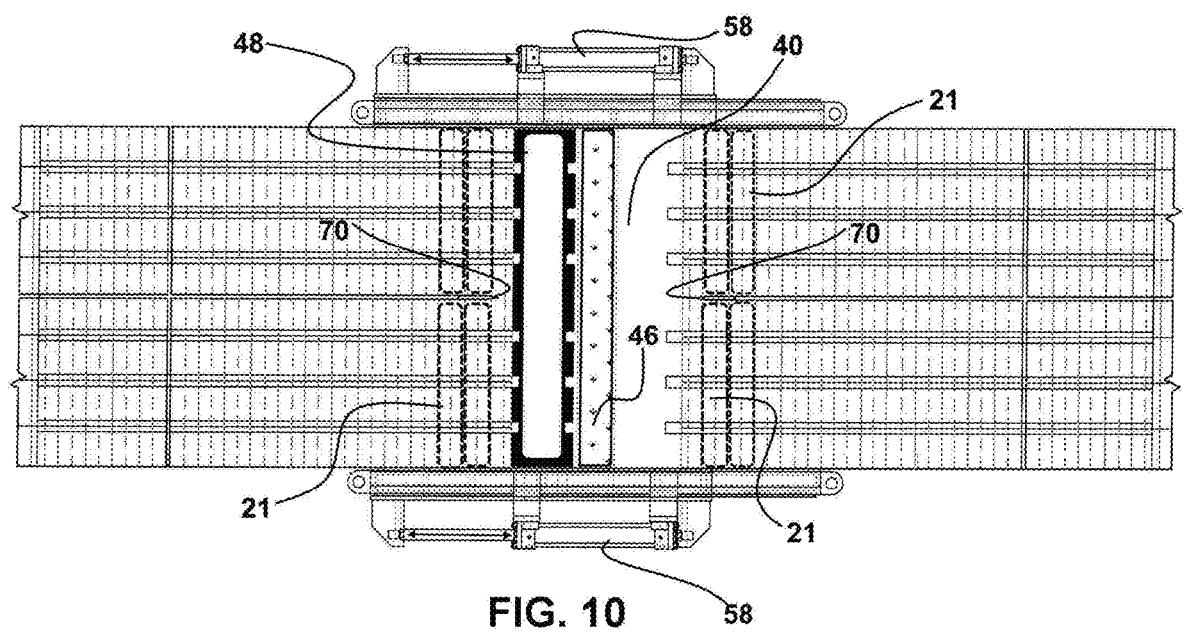
FIG. 10 shows a top view of the baling chamber with the plunger moved to the second stationary position by actuators, and showing half bales formed by center cut knives, which are positioned on exit ramps at both ends of the baling chamber.

The action of the baling knife 70 is shown in FIG. 10 in a top view of the baling chamber 40 with the plunger 48 moved by actuators 58 to cause the bale knife 70 to cut the formed bale at the first end 50 of the baling chamber 40 into half bales 21.

Figure 11:
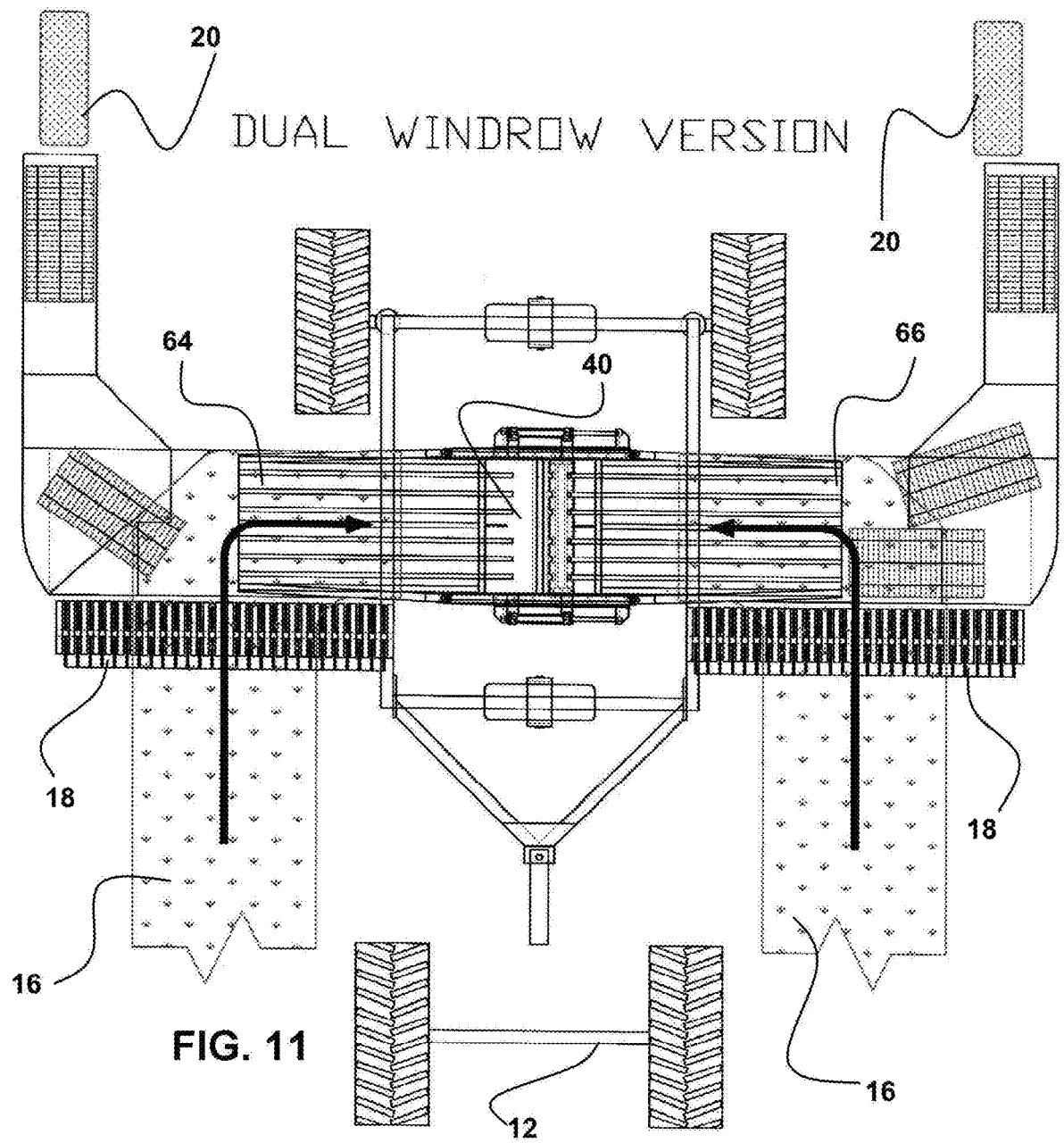
FIG. 11 shows the device herein, operatively mounted upon a frame having treads or wheels for towing by a tractor, and operating to receive hay or material gathered by tines or the like, from two windrows, which is communicated to the centrally located compression passage of FIGS. 2-7 from both windrows, and dispensed as hay bales on both sides of the device.

Shown in FIG. 11 shows the device 10 is mounted on a frame 11 which is configured to roll while engaged to a tractor 12 or other pulling vehicle such as on treads or wheels 13 operatively engaged to the frame 11 on which the device 10 is mounted. So positioned, the device 10 herein operates to receive hay or material 16 to be baled, from two windrows of previously cut material 16 in a field. A conventional pick up component for the material 16 gathers it from the field where it is communicated to the baling chamber, such as by a conveyer. Such pick up components or mechanisms are well known in the art such as pickup tines set slightly above ground level. From the conventional tractor or frame mounted pickup component the uncompressed material 22 is communicated to the centrally located, vertically inclined, compression passage 28 of FIGS. 2-7 from both windrows, and dispensed as hay bales on both sides of the device 10.

Figure 12:
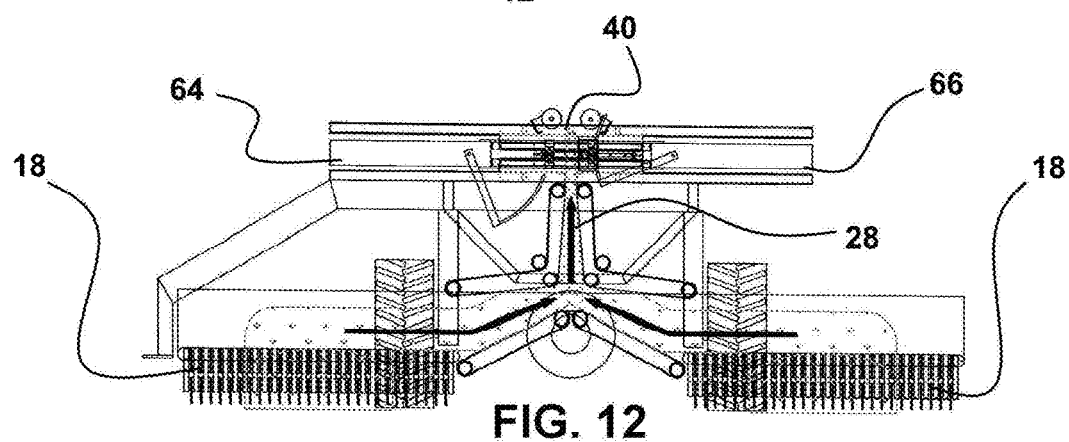
FIG. 12 shows a mode of the device as in FIG. 11, where material to be baled from two different windrows is communicated on opposing conveyers to the centrally located compression passage to be baled within the baling chamber.

FIG. 12 shows a mode of the device 10 as in FIG. 11, where material 16 to be baled from two different windrows is communicated from the pickup component to the opposing conveyers forming the compression passage 28, to be baled within the baling chamber 40.

This invention has other applications, potentially, and one skilled in the art could discover these. The explication of the features of this invention does not limit the claims of this application and other applications developed by those skilled in the art will be included in this invention.

It is additionally noted and anticipated that although the device is shown in its most simple form, various components and aspects of the device may be differently shaped or slightly modified when forming the invention herein. As such those skilled in the art will appreciate the descriptions and depictions set forth in this disclosure or merely meant to portray examples of preferred modes of the bidirectional baler within the overall scope and intent of the invention, and are not to be considered limiting in any manner.

Further, while all of the fundamental characteristics and features of the invention have been shown and described herein, with reference to particular embodiments thereof, a latitude of modification, various changes and substitutions are intended in the foregoing disclosure as well as the claims which follow, and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. A hay baler apparatus positioned on a frame which is adapted for towing, comprising:
    a pickup mechanism, said pickup mechanism configured for collecting material positioned in one or a plurality of windrows;
    a compression passage, said compression passage running between a first sidewall which is opposite a second sidewall and a first conveyer belt running opposite to a second conveyer belt;
    said first conveyer belt extending from a first end thereof to a second end thereof;
    said second conveyer belt extending from a first end thereof to a second end thereof;
    an entry end of said compression passage positioned in between said first end of said first conveyer belt and said first end of said second conveyer belt;
    an exit end of said compression passage positioned in between said second end of said first conveyer belt and said second end of said second conveyer belt;
    a transfer mechanism for moving said material from said pickup mechanism, to said entry end of said compression passage;
    said compression passage decreasing in size between said entry end and said exit end, wherein said compression passage at said entry end is larger than said compression passage at said exit end;
    a baling chamber positioned above said exit end of said compression passage, said bailing chamber for forming rectangular bales of said material, said baling chamber having a first bale ejection end opposite a second bale ejection end;
    said baling chamber having a central area positioned in between said first bale ejection end and said second bale ejection end;

said compression passage operating to communicate a compressed stream of said material from said exit end, into said central area of said baling chamber;

a plunger positioned within said baling chamber, translation of said plunger toward said first bale ejection end of said baling chamber further compressing said compressed stream of material into a bale; and a first exit ramp for exiting of said bale from said first bale ejection end of said baling chamber.

2. The hay baler apparatus of claim 1, further comprising:
concurrent movement of both said first conveyer belt and said second conveyer belt in a direction from said entry end of said compression passage toward said exit end of said compression passage, forming said compressed stream of material.

3. The hay baler apparatus of claim 1, further comprising:
a first tying mechanism for encircling said bale exiting said baling chamber on said first exit ramp, with flexible members.

4. The hay baler apparatus of claim 2, further comprising:
a first tying mechanism for encircling said bale exiting said baling chamber on said first exit ramp, with flexible members.

5. A hay baler apparatus positioned on a frame which is adapted for towing, comprising:
a pickup mechanism, said pickup mechanism configured for collecting material positioned in one or a plurality of windrows;

a transfer mechanism for moving said material from said pickup mechanism, to an entry end of a compression passage;

said compression passage having a first conveyer belt extending from a first end thereof to a second end thereof;

said compression passage having a second conveyer belt extending from a first end thereof to a second end thereof;

said compression passage positioned in between said first conveyer belt and said second conveyer belt;

said entry end of said compression passage positioned in between said first end of said first conveyer belt and said first end of said second conveyer belt;

an exit end of said compression passage positioned in between said second end of said first conveyer belt and said second end of said second conveyer belt;

said compression passage decreasing in size between said entry end and said exit end, wherein said compression passage at said entry end is larger than said compression passage at said exit end;

a baling chamber for forming rectangular bales of said material, said baling chamber having a first bale ejection end opposite a second bale ejection end;

said baling chamber having a central area positioned in between said first bale ejection end and said second bale ejection end;

said compression passage positioned to communicate a compressed stream of said material from said exit end thereof, into said central area of said baling chamber;

a plunger positioned within said baling chamber, translation of said plunger toward said first bale ejection end of said baling chamber further compressing said compressed stream of material into said bale;

a first exit ramp for exiting of said bale from said first bale ejection end of said baling chamber; and said baling chamber is positioned above said compression passage, and an axis of the compression passage runs at an angle between 40 to 90 degrees relative to an axis of the baling chamber.

6. A hay baler apparatus positioned on a frame which is adapted for towing, comprising:
a pickup mechanism, said pickup mechanism configured for collecting material positioned in one or a plurality of windrows;

a transfer mechanism for moving said material from said pickup mechanism, to an entry end of a compression passage;

said compression passage decreasing in size between said entry end and an exit end of said compression passage, wherein said compression passage is larger at said entry end than said compression passage at said exit end;

a baling chamber for forming rectangular bales of said material, said baling chamber having a first bale ejection end opposite a second bale ejection end;

said baling chamber having a central area positioned in between said first bale ejection end and said second bale ejection end;

said compression passage communicating a compressed stream of said material from said exit end, into said central area of said baling chamber;

a plunger positioned within said baling chamber, translation of said plunger toward said first bale ejection end of said baling chamber further compressing said compressed stream of material into said bale;

a first exit ramp for exiting of said bale from said first bale ejection end of said baling chamber;

a first bale knife operatively positioned in said first exit ramp;

said first baling knife having an angle of 5-20 degrees, relative to a surface of said first ramp on which a bale slides; and said first baling knife severing said bale exiting along said first exit ramp, into two smaller bales.

7. A hay baler apparatus positioned on a frame which is adapted for towing, comprising:
a pickup mechanism, said pickup mechanism configured for collecting material positioned in one or a plurality of windrows;

a transfer mechanism for moving said material from said pickup mechanism, to an entry end of a compression passage;

said compression passage decreasing in size between said entry end and an exit end of said compression passage, wherein said compression passage is larger at said entry end than said compression passage at said exit end;

a baling chamber for forming rectangular bales of said material, said baling chamber having a first bale ejection end opposite a second bale ejection end;

said baling chamber having a central area positioned in between said first bale ejection end and said second bale ejection end;

said compression passage communicating a compressed stream of said material from said exit end, into said central area of said baling chamber;

a plunger positioned within said baling chamber, translation of said plunger toward said first bale ejection end of said baling chamber further compressing said compressed stream of material into said bale;

a first exit ramp for exiting of said bale from said first end of said baling chamber;

said plunger positioned within said baling chamber translatable toward both said first bale ejection end of said baling chamber and said second bale ejection end of said baling chamber to further compress said compressed stream of material into a bale, at both of said first bale ejection end and said second bale ejection end thereof; and a second exit ramp for exiting of said bale from said second bale ejection end of said baling chamber.

8. The hay baler apparatus of claim 1 further comprising:

said plunger positioned within said baling chamber translatable toward both said first bale ejection end of said baling chamber and said second bale ejection end of said baling chamber to further compress said compressed stream of material into a bale, at both of said first bale ejection end and said second bale ejection end thereof; and a second exit ramp for exiting of said bale from said second bale ejection end of said baling chamber.

9. The hay baler apparatus of claim 2, further comprising:

said plunger positioned within said baling chamber translatable toward both said first bale ejection end of said baling chamber and said second bale ejection end of said baling chamber, to further compress said compressed stream of material into a bale, at both of said first bale ejection end and said second bale ejection end thereof;

a second exit ramp for exiting of said bale from said second bale ejection end of said baling chamber; and a second tying mechanism for encircling said bale exiting said baling chamber on said second exit ramp, with flexible members.

10. The hay baler apparatus of claim 9, further comprising:

a second bale knife operatively positioned in said second exit ramp;

said second baling knife having an angle of 5-20 degrees, relative to a surface of said second ramp on which a bale slides; and said second baling knife severing said bale exiting along said second exit ramp, into two smaller bales.

11. The hay baler apparatus of claim 1, further comprising:

a flow controller for controlling a speed of movement of the first conveyer belt and the second conveyer belt; and said speed of movement determining a flow rate of the stream of compressed material entering the central area of the baling chamber, from the exit end of the compression passage.

\* \* \* \* \*